| United States Patent [19] | [11] | Patent Number: | 4,879,174 |
|---|---|---|---|
| Marabella | [45] | Date of Patent: | Nov. 7, 1989 |

[54] DEVICE FOR EXPOSING COLORANT TO BE TRANSFERRED

[75] Inventor: Charles P. Marabella, Woodbury, Minn.

[73] Assignee: Minnesota Mining and Manufacturing Company, St. Paul, Minn.

[21] Appl. No.: 818,094

[22] Filed: Jan. 10, 1986

[51] Int. Cl.$^4$ .................. A61K 7/021; A61K 9/70; B32B 3/26

[52] U.S. Cl. .................. 428/321.5; 264/4.7; 424/63; 424/401; 428/207; 428/212; 428/402.2; 428/402.21; 428/914

[58] Field of Search .................. 346/207; 428/317.5, 428/321.5, 914, 201; 424/63, 401

[56] References Cited

U.S. PATENT DOCUMENTS

| 2,932,582 | 4/1960 | Pesa et al. | 117/36 |
|---|---|---|---|
| 3,016,308 | 1/1962 | Macaulay | 428/327 X |
| 3,179,600 | 4/1965 | Brockett | 264/4.3 X |
| 3,825,467 | 7/1974 | Phillips, Jr. | 428/321.5 X |
| 4,154,462 | 5/1979 | Golden et al. | 428/914 X |
| 4,307,169 | 12/1981 | Matkan | 430/111 |
| 4,487,801 | 12/1984 | Turnbull et al. | 428/313.5 |
| 4,564,534 | 1/1986 | Kushida et al. | 428/321.5 X |

*Primary Examiner*—Richard D. Lovering
*Attorney, Agent, or Firm*—Donald M. Sell; Walter N. Kirn; Mark A. Litman

[57] ABSTRACT

Microcapsules having colorant on their exterior surfaces can transfer the colorant when the capsules contain liquids which wet the colorant.

5 Claims, No Drawings

DEVICE FOR EXPOSING COLORANT TO BE TRANSFERRED

BACKGROUND OF THE INVENTION

1. Field of the Invention

The present invention relates to bound microcapsules used to deliver pigments and other colorant materials and to articles containing such microcapsules.

2. Background of the Art

It is fairly common to find encapsulated liquid materials in the marketplace. Technology has been available for many years to effectively provide microcapsules containing liquid oleophilic ingredients. Representative processes are shown in U.S. Pat. Nos. 3,016,308 and 3,516,941. These patents disclose in situ polymerization reactions in which a hydrophobic oil phase is dispersed in an aqueous phase containing resin precursors, particularly aminoplast resin precursors (to form urea/aldehyde resins and the like). High shear agitation is used to keep the capsule size small. Addition of an acid catalyst initiates the polycondensation of the aminoplast precursors, resulting in the deposition of the aminoplast resin about the dispersed droplets of the oil phase. This produces the microcapsules.

Other polycondensation encapsulation techniques are shown in U.S. Pat. Nos. 3,429,827 and 4,000,087. These particular techniques are more limited in the classes of hydrophobic inner phases acceptable in the microcapsules because of reaction with the oil soluble monomer or poor solubility of the monomer in the desired hydrophobic phase.

U.S. Pat. No. 3,930,101 teaches that, to be retained in the hydrophobic phase during high shear dispersion of a fluid particulate dispersion, it is necessary that the particulate be preferentially wetted by the hyrophobic phase. It is suggested to use suitable surfactants which adsorb to the particulate surface as a way to achieve the desired preferential wetting. It has, however, been recognized that, in the in situ polymerization of aminoplast resins method for encapsulation, the presence of surfactants interferes with the deposition of the aminoplast resin at the hydrophobic phase/water phase interface, giving poorly formed or leaky capsules. Similarly, oil soluble suspending agents could alter the wetting of many particulates. Since many of these materials contain carboxylate groups, exposure to highly acidic medias often converts them to carboxylic acid groups altering their adsorbability to the particulates.

U.S. Pat. No. 4,307,169 teaches the inclusion of magnetic materials into a pressure fixable core material within a shell formed by interfacial polycondensation. It is also stated that a dye may be included in the aqueous phase during encapsulation so that it is deposited on the outside of the capsular shell and bonded thereto.

U.S. Pat. No. 3,954,666 teaches the preparation of semipermeable microcapsules containing catalysts and ferromagnetic materials.

U.S. Pat. No. 4,450,221 teaches magnetic toners comprising lyophilic magnetic particles and a resin surrounded by a resin wall to form microcapsules. Colorants such as pigments or dyes may be included in the wall forming resin or the toner. The magnetic particles are rendered lyophilic by treatment with a titanate or silane coupling agent. The coupling agent is said to uniformly disperse the particles in the binder resin and firmly bond the magnetic particle to the resin.

BRIEF DESCRIPTION OF THE INVENTION

Microcapsules which can provide transferable colorant comprise capsules having colorant exterior to the capsule wall and a liquid within the wall which is capable of wetting the colorant. At least 50% of the colorant should be exterior to the microcapsule and within a binder composition.

DETAILED DESCRIPTION OF THE INVENTION

The present invention comprises a device for exposing a colorant so as to enable the colorant to be transferred upon contact, such as by rubbing, to a foreign surface. The device comprises a substrate having on at least one surface thereof a binder adhered or associated with microcapsules. The microcapsules contain a liquid material. The binder has colorant material therein or the exterior wall of the capsule has colorant thereon which is wettable by or soluble in the liquid. The binder is also penetrable by the encapsulated liquid.

The colorant may be in a binder surrounding the capsules, in a binder underlying and adhering an exposed layer of capsules to the substrate, or in a binder layer overlaying the capsules. The last is the least preferred because of the reduced transferability of colorant and the reduced accessibility (and hence reduced frangibility) of the microcapsules.

In accordance with the present invention, microcapsules are prepared by in situ methods such as aminoplast polymerization. The techniques disclosed, generally referred to as an in situ polymerization reaction, yield, for example, an aminoplast resin capsule wall material. In the process, a hydrophobic oil phase is dispersed in an aqueous phase containing the aminoplast resin precursors by applying high shear agitation. Addition of an acid catalyst initiates the polycondensation of the aminoplast precursors, resulting in the deposition of the aminoplast resin about the dispersed droplets of the oil phase, producing the microcapsules.

In practicing the present invention, the colorant may be deposited external to the microcapsules or on the surface of the microcapsules in a number of fashions. The capsules may be formed then subsequently mixed with a solution or dispersion of colorant and binder in a volatile carrier. This mixture can then be coated and dried, leaving the colorant or colorant/binder composition bonded to the capsules containing the liquid capable of wetting the colorant. Emulsion stabilizers may also be used during the encapsulation process to keep the colorant in the water phase so that it will subsequently deposit on the capsule wall upon volatilization of the reaction liquid medium.

The provision of the pigment on the exterior of the capsule wall provides some improvement in the performance of the colorant releasing ability of the capsules, particularly in certain applications. When colorant is dissolved or dispersed in the oil phase within the capsule, the colorant immediately transfers upon breaking the capsule. When the capsules are broken by finger nails or mechanical edges, the colorant will immediately transfer to the finger nail or mechanical scraper, thereby wasting some of the colorant. In the present system, a small induction period exists where the colorant must be wetted by the liquid in the capsule before the colorant will be transferred. This induction period is only a few seconds, but that is sufficient to prevent transfer of the colorant to the rupturing means. The structure of the delivery device of the present invention enables use of pigments and colorants which are ordinarily not encapsulatable. Some colorants cannot be readily encapsulated because of degradation by the encapsulation environment (e.g., high or low pH levels, temperatures, etc.), or are not properly wettable by phases in the process which prevent them from being within the microcapsules as they are formed.

Both organic and inorganic pigments may be used in the practice of the present invention. In addition to pure pigment, cosmetic lakes may also be used. Lakes are commercially available water insoluble pigments which comprise soluble dyes on inorganic substrates. These lake compositions may be bound to the microcapsules to form the colorant carrying microcapsules of the present invention. It is important that at least 50% of the colorant be present outside of the capsule, either adhered to the capsule wall or in the binder associated with the capsule. It is preferred that at least 80% by weight of the colorant be outside the capsule and more preferred that 95% or 100% by weight of the colorant be outside the capsule. It is not necessary that the colorant have any additional properties (such as being magnetic), but some pigments do have secondarily useful properties such as aroma, bacteriacidal properties, and the like.

A wide range of proportions of the various ingredients may be used to vary the colorant transferral effect. Varying the proportions of the microcapsules, pigment and colorant will alter the density of colorant transferred, the speed of transferral and the area over which effective color transfer may be made. In general, however, the following relative proportions are found to be advisable. The ratio of pigment to binder should be within the range of 1-25 parts by weight pigment to 1 part by weight of binder. The ratio of capsules to binder should be 4-49 parts by weight of capsules to 1 part by weight of binder. The ratio of capsules to pigment should be about from 20/1 to 1/3 parts by weight capsules/pigment. The ratio of the three components, using the binder as a fixed 1 part by weight thus should be within the approximate range of pigment/binder/capsules by weight of 25-1/1/49-4 with a preferred range of about 15-2/1/49-10. These proportions are in the dry coated weight of the ingredients.

The pigments or colorant materials should be present as at least 10% by weight of the capsules, preferably as at least 25% by weight of the capsules and more preferably as at least 40% by weight of the capsules (including the weight of the wetting liquid therein). The colorant usually is present as from 10-200% by weight of the capsules.

The hydrophobic inner phase for the capsule may be any in situ aminoplast encapsulatable composition as discussed in U.S. Pat. No. 3,516,941. The liquid within the capsule must be capable of wetting the colorant sufficiently to carry it off the surface of the substrate to which the capsules are bound. The liquid material need not even be a true liquid, it can be a soft wax at room temperature which flows under light pressure and can wet the surface of the colorant. Typical materials may be transdermal drug delivery oils, fragrance oils, mineral oils, emollients such as isopropyl myristate, C12-C15 alcohols benzoate and jojoba oil, triglycerides such as castor oil and macademia oil, plasticizers such as the phthalate esters, waxes such as found in lipsticks, polybutene etc.

When the microcapsule is prepared by interfacial polycondensation, the capsule skin may be composed of any condensation polymer or addition polymer, e.g., polyamide, polyurethane, polysulfonamide, polyurea, polyester, polycarbonate, etc. Polyamides prepared by interfacial polycondensation of an amine with an acid chloride or polymers formed by reaction of isocyanate prepolymer with polyamines are preferred. Microcapsules formed by coacervation processes are also useful in forming microcapsule shells according to the present invention. Coacervation is the well known process of forming higher molecular weight gelatin polymers as taught in U.S. Pat. Nos. 2,800,458 and 2,800,457.

The preferred use of these capsules is in sampling devices wherein colors can be deposited on other surfaces. For example, the capsules can be coated with a binder onto a carrier surface. The capsules are ruptured by conventional means and the color transferred to a second surface by rubbing. Organic polymeric binders are preferably used, but natural binders such as gelatin, gum arabic, starch and sap can be used. The sheet material samplers can be made by blending the capsules into a diluted (with solvent) binder and then coating of all or a portion of the carrier surface.

Conventional rupturing means can be finger nails, pencils, blunt edges, a scraper or the like. Newer, but now conventional means for rupturing capsules is disclosed in U.S. Pat. No. 4,487,801. In the present case, one device for exposing colorant material for transfer to another surface comprises at least two sheets bound by a single layer of a non-pressure sensitive adhesive composition layer. The adhesive composition layer contains the microcapsules of the present invention. The cohesive strength of the adhesive composition layer is less than the strength of the bond between said adhesive composition and said sheets, and the tensile rupture strength of the microcapsules is less than the cohesive strength of the adhesive composition.

Another device for exposing colorant material comprises a sheet coated on one side and having a removable protective covering sheet to prevent premature capsule breakage. The coating may be exposed by removing the protective coating and then rubbing against an object (skin, paper, solid article, wood, ceramic, etc.) thereby rupturing capsules. This releases the colorant-wetting liquid and (after an induction period) effects transfer of colorant to the object.

The capsules used in these single sheet or multiple sheet constructions and generally in the practice of the present invention have average diameters between 4 and 100 microns. Preferably the average diameters are between 10 and 80 microns. The capsules preferably constitute from 20 to 98% by volume or weight of the adhesive composition layer, most preferably between 50 and 85% by weight or volume of said adhesive composition layer.

EXAMPLE 1

A 1% Gelvatol 20-60 poly(vinyl alcohol) solution as prepared by addition of the Gelvatol 20-60 pva (6.0 g) to an agitated solution of tap water (594.0 g). The resulting mixture was stirred at room temperature for 2 hours to ensure dissolution of the pva. This solution (600.0 g) was then charged to a wide-mouth jar along with D & C Red #30 Aluminum Lake cosmetic pigment (48.0 g) with a small amount of ⅛" flint glass milling beads. The dispersion was ball-milled for at least 17 hours to achieve good size reduction and wetting. An aliquot of that dispersion (50.0 g) was decanted into a 2 oz. wide-mouth jar and microcapsules containing diethylphthalate (11.0 g) were thoroughly mixed into the dispersion with an overhead stirrer. As the solution was mixing, a sample was withdrawn from the jar and coated using a #38 Meyer rod on #80 coated one-side base stock (onto the uncoated surface). The sample was oven dried at 100° C. for 5 minutes and exhibited pigment transfer to the skin by rubbing on the back of the hand. A wide variety of cosmetic pigments have been evaluated and while some appear to transfer more efficiently than others, all exhibit some pigment release upon rubbing. This is in contrast to systems which contain only pigment and binder (i.e. no microcapsules). These coatings will not transfer to the skin via rubbing, but require actual scraping from the substrate for effective removal.

EXAMPLES 2-15

The following cosmetic pigments have been shown to be useful in a repeat of Example 1.
Example 2 D & C Orange No. 5
Example 3 D & C Orange No. 5 (Aluminum Lake)
Example 4 D & C Red No. 33 (Zirconium Lake)
Example 5 D & C Red No. 7 (Calcium Lake)
Example 6 D & C Red No. 6
Example 7 D & C Red No. 36 (Barium Lake)
Example 8 FD & C Yellow No. 6 (Aluminum Lake)
Example 9 D & C Red No. 30 (Aluminum Hydrate Extension)
Example 10 D & C Red No. 30 (Talc Extension)
Example 11 Hydrated Chrome Oxide Green
Example 12 Iron Oxide Red
Example 13 Iron Oxide Black
Example 14 Chrome Oxide Green
Example 15 Titanium Dioxide

EXAMPLE 16

A urea-formaldehyde polymer precondensate solution was prepared according to the teaching of U.S. Pat. No. 3,516,941. The microcapsules were formed of the following materials as described in U.S. Pat. No. 3,516,941.

| Material | Wt % |
|---|---|
| (1) Urea-formaldehyde polymer precondensate | 24.71 |
| (2) Water | 35.89 |
| (3) Mineral Oil (Internal Phase) | 32.37 |
| (4) Sodium chloride | 6.39 |
| (5) Sodium carboxymethylcellulose (CMC) | 0.64 |

To a controlled temperature container (85° F.) fitted with a Waring blender impeller was added the polymer precondensate, water, sodium chloride and sodium CMC. After dissolution was complete, the oil was slowly added under high agitation. Upon completion of the oil addition, the pH of the emulsion was adjusted to about 2.0 using a 10% aqueous sulfuric acid solution, while maintaining the high agitation condition. The temperature was elevated to complete the polymerization reaction. Upon completion, the pH of dispersion was adjusted to 7.5 with 10% sodium hydroxide (Aq), and the microcapsules washed and collected.

I claim:

1. A device for exposing a colorant so as to enable said colorant to be transferred upon contact with a foreign surface, said device comprising a substrate having on at least one surface thereof a binder adhered to microcapsules containing a liquid, said microcapsules being present in an amount comprising 20 to 98% by weight of the combined weight of binder and microcapsules, said binder containing colorant which is wettable by said liquid, said binder being penetrable by said liquid, and said colorant being a lake.

2. The device of claim 1 in which at least 80% by weight of said colorant is exterior to the capsule and located within the binder and on the capsule wall.

3. A device for exposing a colorant so as to enable said colorant to be transferred upon contact with a foreign surface, said device comprising a substrate having on at least one surface thereof of a binder adhered to microcapsules containing a liquid, said binder containing a colorant which is wettable by said liquid, and said binder being penetrable by said liquid, wherein the colorant has a color selected from the group consisting of red, yellow, orange and green.

4. A device for exposing a colorant so as to enable said colorant to be transferred upon contact with a foreign surface, said device comprising a substrate having on at least one surface thereof a binder adhered to microcapsules containing a liquid, said binder containing colorant which is wettable by said liquid, said binder being penetrable by said liquid, and at least 50% of said colorant being exterior to said microcapsules and within said binder, wherein the colorant has a color a selected from the group consisting of red, yellow, orange and green.

5. A device for exposing a colorant so as to enable said colorant to be transferred to a surface, said device comprising
(1) at least two sheets bound by a single layer of a non-pressure sensitive adhesive composition layer,
(2) said adhesive composition layer containing a microcapsule having an average size of between 4 and 100 microns, said microcapsule containing a liquid therein and a colorant on the exterior wall of said microcapsule, at least 50% of the colorant associated with said microcapsule being exterior to said microcapsule and said liquid being capable of wetting said colorant, and the cohesive strength of the adhesive composition layer being less than the strength of the bond between said adhesive composition and said sheets, and the tensile rupture strength of said microcapsules being less than the cohesive strength of the adhesive composition.

* * * * *